(12) United States Patent
Paes et al.

(10) Patent No.: US 10,108,339 B2
(45) Date of Patent: Oct. 23, 2018

(54) REDUCTION OF INTERMINGLING OF INPUT AND OUTPUT OPERATIONS IN SOLID STATE DRIVES

(71) Applicant: INTEL CORPORATION, Santa Clara, CA (US)

(72) Inventors: Gavin F. Paes, Atlanta, GA (US); Sanjeev N. Trika, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 81 days.

(21) Appl. No.: 14/573,517

(22) Filed: Dec. 17, 2014

(65) Prior Publication Data

US 2016/0179381 A1    Jun. 23, 2016

(51) Int. Cl.
*G06F 3/06* (2006.01)

(52) U.S. Cl.
CPC .......... *G06F 3/0604* (2013.01); *G06F 3/0644* (2013.01); *G06F 3/0664* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,799,554 B1 * | 8/2014 | Vincent | G06F 9/5016 711/137 |
| 2004/0225855 A1 * | 11/2004 | Branch | G06F 3/0608 711/170 |
| 2010/0083247 A1 | 4/2010 | Kanevsky et al. | |
| 2010/0241785 A1 | 9/2010 | Chen et al. | |
| 2014/0169186 A1 * | 6/2014 | Zhu | H04B 3/542 370/252 |
| 2014/0282514 A1 | 9/2014 | Carson et al. | |
| 2015/0347296 A1 * | 12/2015 | Kotte | G06F 12/0269 711/103 |
| 2015/0363422 A1 * | 12/2015 | Shibayama | G06F 3/0605 707/827 |
| 2016/0019080 A1 * | 1/2016 | Chang | G06F 9/45558 718/1 |

(Continued)

FOREIGN PATENT DOCUMENTS

| | | |
|---|---|---|
| EP | 2306318 | 4/2011 |
| WO | 2014108933 | 7/2014 |

OTHER PUBLICATIONS

NVM Express, Inc., "NVM Express", Revision 1.2, Nov. 3, 2014, 205 pp.

(Continued)

*Primary Examiner* — Edward J Dudek, Jr.
*Assistant Examiner* — Ralph A Verderamo, III
(74) *Attorney, Agent, or Firm* — Konrad Raynes Davda & Victor LLP; Rabindranath Dutta

(57) ABSTRACT

An operating system of a computational device manages access of a plurality of applications to a solid state drive. Separate bands are maintained in the solid state drive for storing writes of at least two different applications of the plurality of applications. Additionally, in other embodiments, a virtual machine manager of a computational device manages access of a plurality of virtual machines to a solid state drive. Separate bands are maintained in the solid state drive for storing writes of at least two different virtual machines of the plurality of virtual machines.

25 Claims, 8 Drawing Sheets

(56) References Cited

U.S. PATENT DOCUMENTS

2016/0092352 A1* 3/2016 Camp ................ G06F 12/0253
710/103

OTHER PUBLICATIONS

Serial ATA International Organization, "Serial ATA Revision 3.2", Aug. 7, 2013, 874 pp. (Submitted in two parts to comply with EFS-Web file size limits—Part A: 142 pp; Part B: 732 pp.).
U.S. Appl. No. 14/671,968, entitled "Sequential Write Stream Management", filed Mar. 27, 2015, invented by A. S. Ramalingam, 52 pp.
International Search Report and Written Opinion for International Application No. PCT/US2015/61184, dated Mar. 31, 2016, 12 pp.
Office Action 1 and Search Report for TW Application No. 104136331, dated Oct. 3, 2016, 8 pp. [w/ English Translation of SR].
International Preliminary Report on Patentability for International Application No. PCT/US2015/061184, dated Jun. 29, 2017, 9 pp.

* cited by examiner

REDUCTION OF INTERMINGLING OF INPUT AND OUTPUT OPERATIONS IN SOLID STATE DRIVES

BACKGROUND

In computing, a virtual machine (VM) is an emulation of a particular computer system. Virtual machines operate based on the computer architecture and functions of a real or hypothetical computer, and mechanisms that implement virtual machines may include specialized hardware, software, or firmware.

A hypervisor or virtual machine manager (VMM) is a piece of computer software, firmware or hardware that creates and runs a plurality of virtual machines. A computer on which a hypervisor is running one or more virtual machines may be referred to as a host machine. Each virtual machine may be referred to as a guest machine. The hypervisor presents the guest operating systems with a virtual operating platform and manages the execution of the guest operating systems. A plurality of instances of a variety of operating systems may share virtualized hardware resources.

The virtualized hardware resources shared by the plurality of instances of the variety of operating systems may include one or more solid state drives. A solid state drive (SSD) is a data storage device that uses integrated circuit assemblies as memory to store data persistently. SSDs have no moving mechanical components and this distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency. Many type of SSDs use NAND-based flash memory which retains data without power and is a type of non-volatile storage technology.

SSDs operate on entire blocks of memory. Before writing to a memory cell, flash memory needs to be erased, which requires the application of a large voltage to the memory cells, which can only happen to an entire memory cell block at once. For example, if 1 KB of data is to be written to an SSD with an erase block size of 128 KB, the SSD needs to read 127 KB from the target block, erase the block and write the old data plus the new data back into the block. SSD firmware may pre-erase blocks and try to write new data into these pre-erased blocks.

BRIEF DESCRIPTION OF THE DRAWINGS

Referring now to the drawings in which like reference numbers represent corresponding parts throughout.

DETAILED DESCRIPTION

Figure 1:
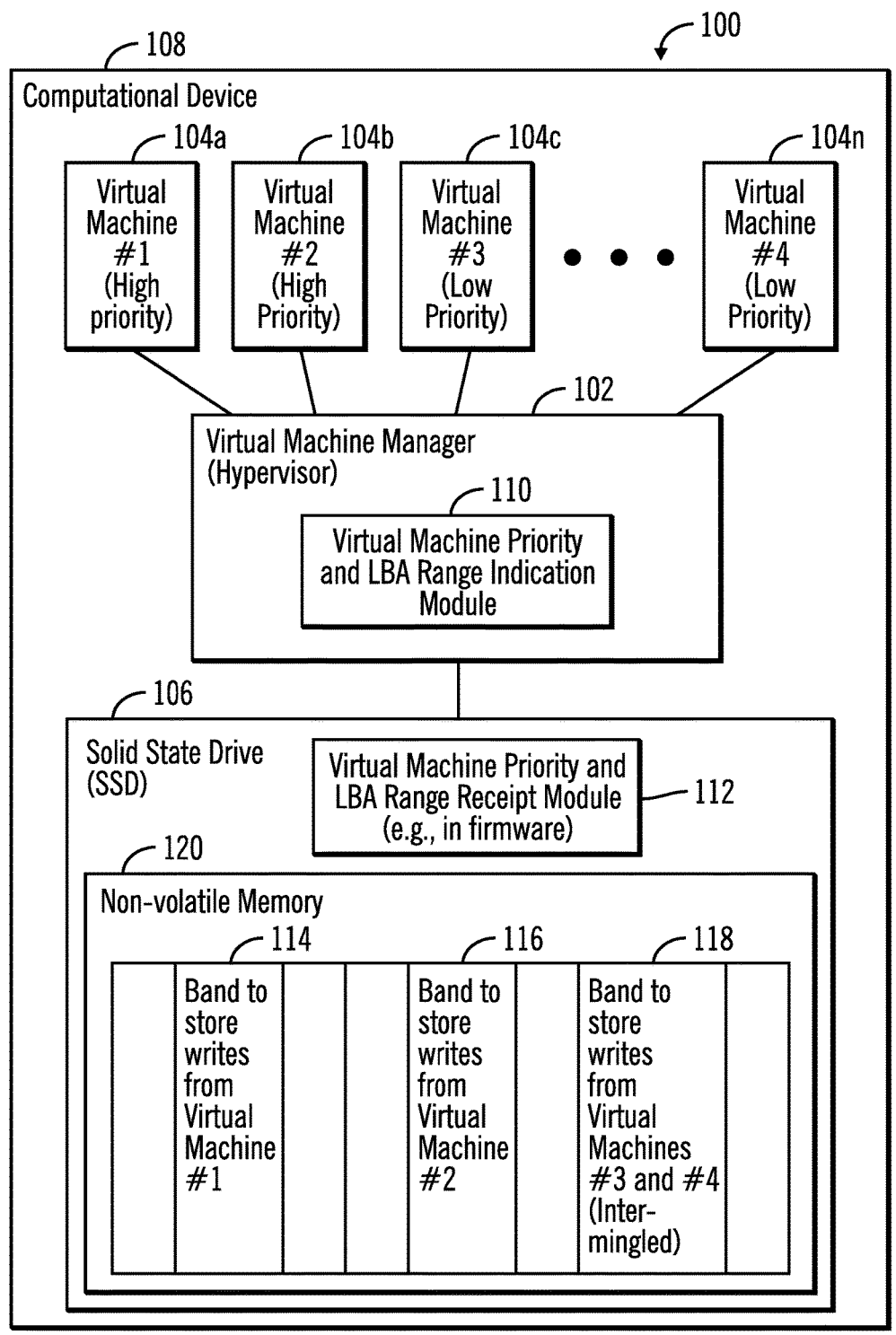
FIG. 1 illustrates a block diagram of a computing environment in which a virtual machine manager controls the access of a plurality of virtual machines to write data to a SSD, in accordance with certain embodiments.

In the following description, reference is made to the accompanying drawings which form a part hereof and which illustrate several embodiments. It is understood that other embodiments may be utilized and structural and operational changes may be made.

Performance of solid state drives may be significantly superior for sequential input/output (I/O) than for non-sequential (e.g., random or intermingled) I/O. In non-sequential I/O, a part of a file may be accessed in any order. In sequential I/O, the first part of a file is accessed, before accessing the second part, and the second part is accessed before accessing the third part, as so on. For writes, sequential I/O is superior in performance over non-sequential I/O because of lower internal write-amplification, and for reads sequential I/O is superior in performance over non-sequential I/O because of the ability to perform prefetching of data. Write amplification is an undesirable phenomenon associated with SSDs because as a result of write amplification the actual amount of physical information written is a multiple of the logical amount intended to be written. Write amplification may be measured by the ratio of writes committed to the SSD to the writes coming from a host system. Rewriting some data in a SSD requires an already used portion of the SSD to be read, updated and written to a new location, together with initially erasing the new location if it was previously used at some point in time; due to the way SSD works, much larger portions of SSD may be erased and rewritten than actually required by the amount of new data. This multiplying effect increases the number of writes required and results in write-amplification. In sequential I/O write amplifications are a lot less than in non-sequential I/O. As a result superior performance is obtained when writes are performed via sequential I/O in SSDs.

However, in virtualized systems that perform I/O with respect to SSDs, even sequential I/O requests from various virtual machines (VMs) or applications may become intermingled at the hypervisor level before being issued to the underlying SSD, resulting in lower storage and system performance. The intermingling at the hypervisor level causes the data to be stored in an intermingled or non-sequential manner in the SSD, and as a result advantages of sequential I/O with respect to the SSD may not obtained in a virtualized system.

Certain embodiments provide mechanisms to reduce or eliminate performance degradation in SSDs caused by the intermingling of I/O from various virtual machines. In particular, the performance of the handling of write requests is greatly enhanced by reducing the intermingling of writes of different virtual machines.

In certain embodiments, a particular virtual machine's write requests are directed to a selected band of the solid state disk, where the selected band is independent of the other bands of the solid state disk, and where each band in the SSD is a collection of contiguous pre-erased erase-blocks in the SSD (i.e., a band may be a range of sequential physical memory locations in non-volatile memory; for example, a band may comprise sequential blocks of NAND memory). This is done by providing information to the solid state disk on each virtual machine's logical block address (LBA) range that allows the solid state disk to determine which band to use for each incoming write request. This reduces intermingling of I/O from different virtual machines within a given band, resulting in lower write amplification (especially when several virtual machines are issuing sequential I/O) and improving performance for writes.

FIG. 1 illustrates a block diagram of a computing environment 100 in which a virtual machine manager 102 controls the access of a plurality of virtual machines 104a, 104b, 104c, . . . , 104n to write data to a solid state drive 106, in accordance with certain embodiments. The virtual machines 104a . . . 104n and the virtual machine manager 102 are implemented in hardware, software, or firmware, or any combination thereof in a computational device 108. The solid state drive 106 may be located within the computational device 108 (as shown in FIG. 1) or may be located external to the computational device 108 and be coupled to the computational device 108.

The solid state drive 106 may be comprised of non-volatile memory 120, such as NAND memory, NOR memory or some other suitable non-volatile memory. In certain embodiments, the solid state drive 106 may be capable of storing several terabytes of data or more. Certain embodiments may be applied to other types of non-volatile memory, phase change memory (PCM), a three dimensional cross point memory, a resistive memory, nanowire memory, ferro-electric transistor random access memory (FeTRAM), magnetoresistive random access memory (MRAM) memory that incorporates memristor technology, spin transfer torque (STT)-MRAM, byte addressable random access non-volatile memory, etc.

In certain embodiments, the computational device 108 may be comprised of any suitable computational device, such as a personal computer, a mainframe, a telephony device, a smart phone, a storage controller, a blade computer, a processor with memory, etc. In certain alternative embodiments, the computational device 108 may communicate with the SSD 106 over a bus (such as a Peripheral Component Interconnect (PCIe), Serial Advanced Technology Attachment (SATA), Serial Attached Small Computer System Interface (SAS)) or a network, such as the Internet, a storage area network (SAN), a local area network (LAN), etc. Further details of the SATA specification may be found in the publication titled "Serial ATA Specification, Revision 3.2," released August 2013, by SATA International Organization (SATA-IO), Beaverton, Oreg. In another example, the interface and/or interconnect protocol may comply and/or be compatible with a NVMe (Non-Volatile Memory Host Controller Interface Express). Further details of NVMe may be found in the publication titled "NVM Express™, Revision 1.2," released Nov. 3, 2014 by NVM Express™ Work Group, and/or earlier and/or later versions of this specification (NVM Express is a trademark of NVM Express, Inc.).

Each of the virtual machines 104a . . . 104n may have a priority associated with it. For example, virtual machine 104a, 104b may have a high priority and virtual machine 104c, 104n may have a low priority as shown in FIG. 1. In certain exemplary embodiments, the priorities may be indicated qualitatively as high or low, or quantitatively as a numerical value that corresponds to the priority. A higher priority for a virtual machine means that I/O from the virtual machine should be provided with a prioritized execution over I/O from a virtual machine with a lower priority.

The virtual machine manager 102 (also referred to as a hypervisor) may include a virtual machine priority and logical block address (LBA) range indication module 110 implemented in hardware, software, firmware any combination thereof. The virtual machine priority and LBA range indication module 110 may transmit the priority and LBA range of a virtual machine to the a virtual machine priority and LBA range receipt module 112 that executes in the solid state drive 106 and is implemented in hardware, software, firmware any combination thereof. Application Programming Interfaces (API) may be defined to be used for the communications between the virtual machine priority and LBA range indication module 110 and the virtual machine priority and LBA range receipt module 112. The LBA is a value that maps to a specific address on the SSD.

In a virtualized environment, the plurality of virtual machines 104a . . . 104n share access to the single solid state drive 106. Each virtual machine is assigned a range of LBAs supported by the solid state drive 106, where the virtual machine may access the assigned LBAs in the solid state drive 106. The accesses of the SSD 106 are supervised by the virtual machine manager 102 and the SSD 106 to ensure that virtual machines access only their assigned range of LBAs.

The virtual machine priority and LBA range indication module 110 and the virtual machine priority and LBA range receipt module 112 interface between the virtual machine manager 102 and the solid state drive 106 for informing the solid state drive 106 of the LBA ranges of the different virtual machines, and optionally the priorities of the virtual machines. This information is sent to the solid state drive 106 each time the computational device 108 is booted, or a virtual machine is destroyed, created, or modified.

The solid state drive 106 writes data into internal pages within contiguous pre-erased Erase-Blocks (EB) of non-volatile memory that are referred to as bands. Based on the information of the LBA ranges of the virtual machines, the solid state drive 106 may use a dedicated band for each virtual machine, ensuring that the writes of one virtual machine are not intermingled with writes from other virtual machines.

However, if the system supports more virtual machines than the number of available bands, then the solid state drive 106 may either intermingle a few of the virtual machines' writes into each open band, or use a mechanism in which high-priority virtual machines get their own open band but lower priority virtual machines' writes are intermingled. For example, in FIG. 1, band 114 stores data received in write requests (referred to as "writes") received from virtual machine #1 104a, band 116 stores writes from virtual machine #2 104b, and band 118 stores writes from virtual machine #3 104c and virtual machine #4 104n. Thus, the writes of low priority virtual machines 104*c*, 104*d* are intermingled in band 118, whereas the writes of high priority virtual machines 104*a*, 104*b* are stored in separate bands. The performance of virtual machines 104*a*, 104*b* will likely be superior to the performance of virtual machines 104*c*, 104*n*, at least with respect to write operations.

Therefore, FIG. 1 illustrates certain embodiments, in which each virtual machine is assigned an LBA range and optionally a priority that are communicated by the virtual machine manager 102 to the solid state drive 106. If an adequate number of bands are available in the solid state drive 106 then writes of different virtual machines are stored in different bands. However, if an adequate number of bands are not available, then the writes of lower priority virtual machines are intermingled in the same band.

In certain embodiments, the solid state drive 106 stores in a non-volatile manner, the data related to the plurality of virtual machines 104*a* . . . 104*n*, the logical block address ranges, and the priority of each of the plurality of virtual machines across a plurality of boots.

Figure 2:
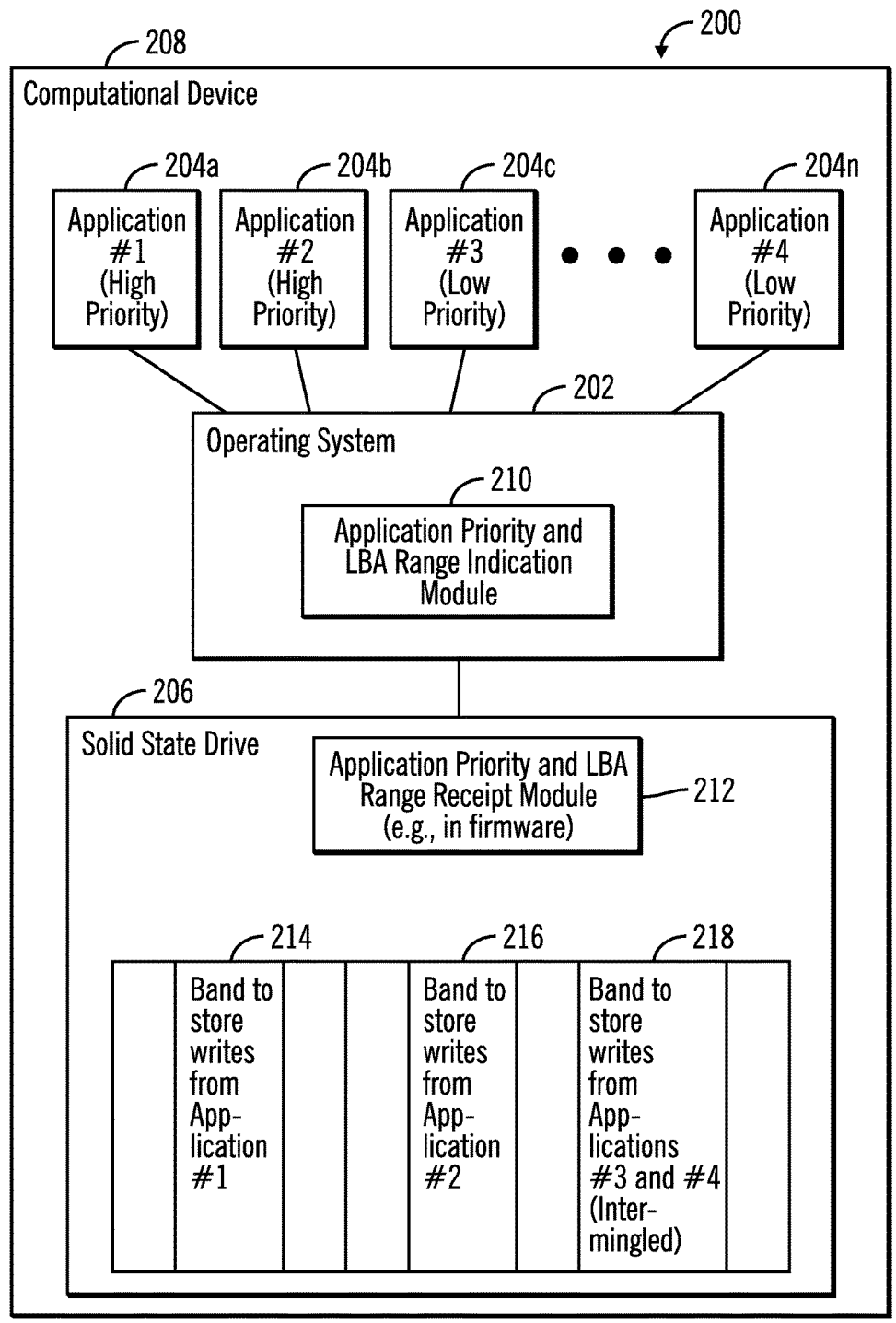
FIG. 2 illustrates a block diagram of a computing environment in which an operating system controls the access of a plurality of applications to write data to a SSD, in accordance with certain embodiments.

FIG. 2 illustrates a block diagram of a computing environment 200 in which an operating system 202 controls the access of a plurality of applications 204*a*, 204*b*, 204*c*, . . . , 204*n* to write data to a solid state drive 206, in accordance with certain embodiments. The applications 204*a* . . . 204*n* and the operating system 202 are implemented in hardware, software, or firmware, or any combination thereof in a computational device 208. The solid state drive 206 may be located within the computational device 208 (as shown in FIG. 2) or may be located external to the computational device 208.

The solid state drive 206 may be comprised of non-volatile memory, such as NAND memory, NOR memory or some other suitable non-volatile memory. In certain embodiments, the solid state drive 206 may be capable of storing several terabytes of data or more. Certain embodiments may be applied to other types of non-volatile memory, phase change memory (PCM), a three dimensional cross point memory, a resistive memory, nanowire memory, ferro-electric transistor random access memory (FeTRAM), magnetoresistive random access memory (MRAM) memory that incorporates memristor technology, spin transfer torque (STT)-MRAM, etc.

Each of the applications 204*a* . . . 204*n* may have a priority associated with it. For example, application 204*a*, 204*b* may have a high priority and application 204*c*, 204*n* may have a low priority as shown in FIG. 2. In certain exemplary embodiments, the priorities may be indicated qualitatively as high or low, or quantitatively as a numerical value that corresponds to the priority. A higher priority for an application means that it should be provided with prioritized execution over an application with a lower priority.

The operating system 202 may include an application priority and logical block address (LBA) range indication module 210 implemented in hardware, software, and firmware any combination thereof. The application priority and LBA range indication module 210 may transmit the priority and LBA range of an application to the application priority and LBA range receipt module 212 that executes in the solid state drive 206. Application Programming Interfaces may be defined to perform the communications between the application priority and logical block address (LBA) range indication module 110 and the application priority and LBA range receipt module 112.

In a virtualized environment, the plurality of applications 204*a* . . . 204*n* share access to the single solid state drive 206. Each application is assigned a range of LBAs supported by the solid state drive 206, where the application can access the assigned LBAs in the solid state drive 206. The solid state drive 206 accesses are supervised by the operating system 202 to ensure that applications access only their assigned range of LBAs.

The application priority and LBA range indication module 210 and the application priority and LBA range receipt module 212 interface between the operating system 202 and the solid state drive 206 for informing the solid state drive 206 of the LBA ranges of the different applications, and optionally the application priorities. This information is sent to the solid state drive 206 each time the computational device is booted, or an application is destroyed, created, or modified.

The solid state drive 206 writes data into internal pages within bands. With information of the LBA ranges of the applications, the solid state drive 206 may use a dedicated band for each application, ensuring that the writes of one application are not intermingled with writes from other applications.

However, if the system supports more applications than the number of available bands, then the solid state drive 206 may either intermingle a few of the applications' writes into each open band, or use a mechanism in which high-priority applications get their own open band but lower priority applications' writes are intermingled. For example, in FIG. 2, band 214 stores writes from application #1 204*a*, band 216 stores writes from application #2 204*b*, and band 218 stores writes from application #3 204*c* and application #4 204*n*. Thus, the writes of low priority applications 204*c*, 204*d* are intermingled in band 218, whereas the writes of high priority applications 204*a*, 204*b* are stored in separate bands.

Therefore, FIG. 2 illustrates certain embodiments, in which each application is assigned an LBA range and optionally a priority that are communicated by the operating system 202 to the solid state drive 206. If an adequate number of bands are available in the solid state drive 206 then writes of different applications are stored in different bands. However, if an adequate number of bands are not available, then the writes of lower priority applications are intermingled in the same band 218. The performance of the applications whose writes are not intermingled with those of other applications is superior to the performance of the applications whose writes are intermingled.

In certain embodiments, the solid state drive 206 stores in a non-volatile manner, the data related to the plurality of applications, the logical block address ranges, and the priority of each of the plurality of applications across a plurality of boots.

Figure 3:
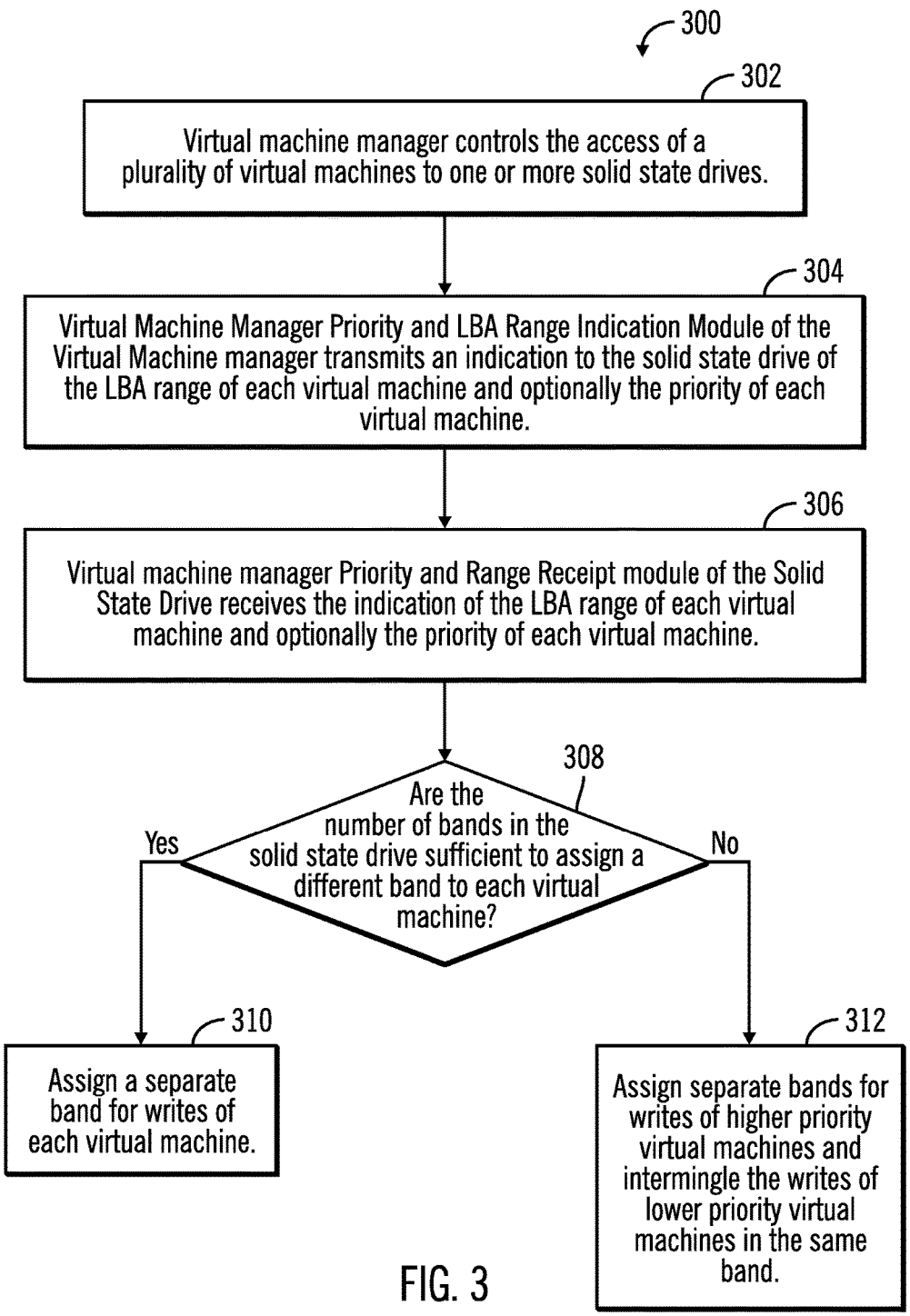
FIG. 3 illustrates a flowchart that shows operations for writing data to a SSD in a computing environment in which a virtual machine manager controls the access of a plurality of virtual machines to write data to the SSD, in accordance with certain embodiments.

FIG. 3 illustrates a flowchart 300 that shows operations for writing data to a SSD 106 in a computing environment 100 in which a virtual machine manager 102 controls the access of a plurality of virtual machines 104*a* . . . 104*n* to write data to the SSD 106, in accordance with certain embodiments.

Control starts at block 302 in which a virtual machine manager 102 controls the access of a plurality of virtual machines 104*a* . . . 104*n* to one or more solid state drives 106. The virtual machine manager priority and LBA range indication module 110 of the virtual machine manager transmits (at block 304) an indication to the solid state drive 106 of the LBA range of each virtual machine and optionally the priority of each virtual machine.

Control proceeds to block 306 in which the virtual machine manager priority and range receipt module 112 of the solid state drive 106 receives the indication of the LBA range of each virtual machine and optionally the priority of each virtual machine, and determines (at block 308) whether the number of bands in the solid state drive 106 are sufficient to assign a different band to each virtual machine.

If the number of bands in the solid state drive 106 are sufficient to assign a different band to each virtual machine, then a separate band is assigned (at block 310) for writes of each virtual machine. If the number of bands in the solid state drive 106 are insufficient to assign a different band to each virtual machine, then separate bands are assigned for writes of higher priority virtual machines and the writes of lower priority virtual machines are intermingled in the same band (reference numeral 312). If all virtual machines have a high priority then the writes of all the virtual machines may be intermingled in the bands.

Therefore, FIG. 3 illustrates certain embodiments in which an attempt is made to place the writes of different virtual machines in different bands. If this is not possible, then writes of higher priority virtual machines are placed in their own band, whereas writes of lower priority virtual machines are intermingled within the same band. Therefore, even in a virtualized environment, sequential I/O is preserved to the extent possible.

Figure 4:
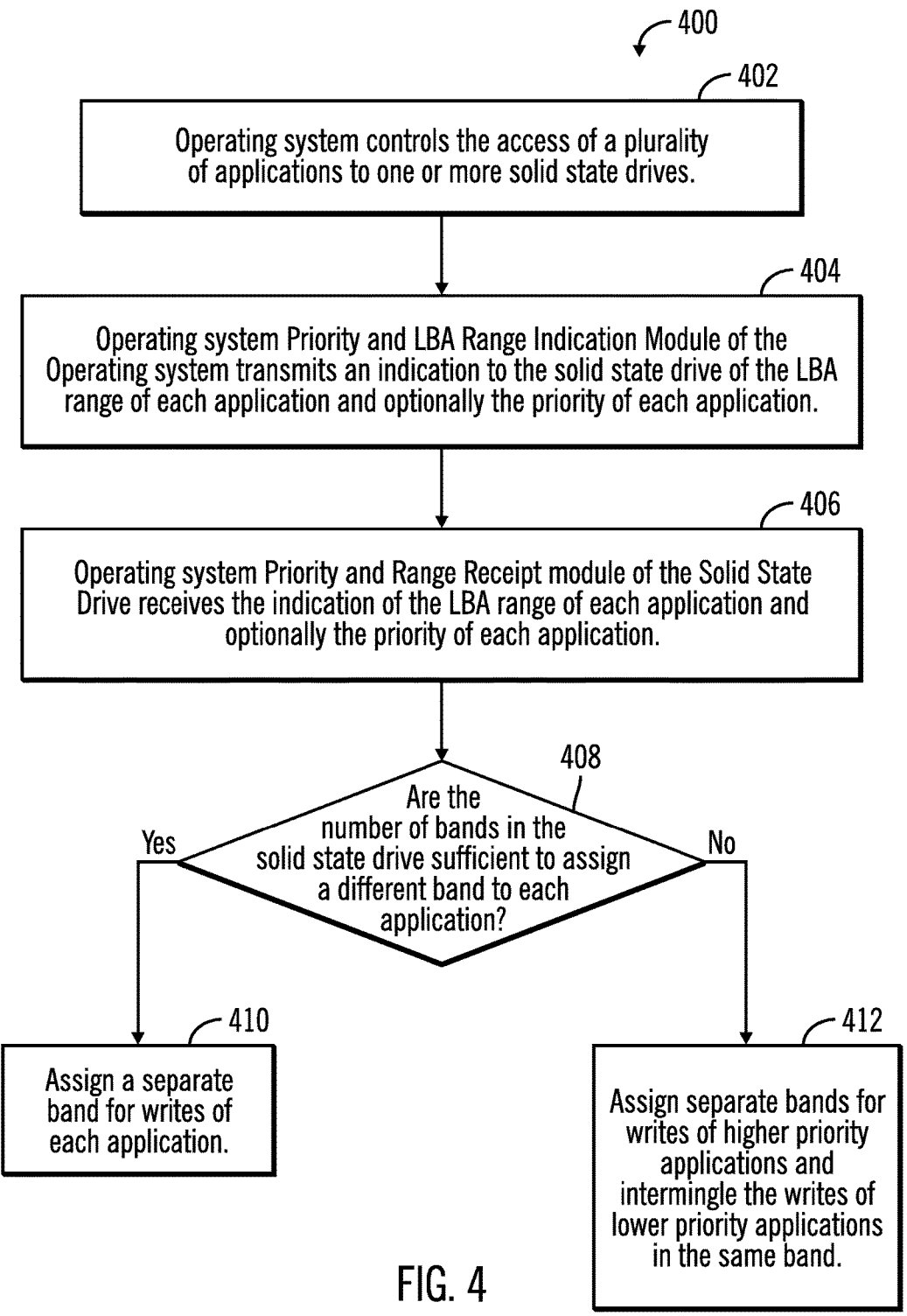
FIG. 4 illustrates a flowchart that shows operations for writing data to a SSD in a computing environment in which an operating system controls the access of a plurality of applications to write data to the SSD, in accordance with certain embodiments.

FIG. 4 illustrates a flowchart 400 that shows operations for writing data to a SSD 206 in a computing environment 200 in which an operating system 202 controls the access of a plurality of applications 204a . . . 204n to write data to the SSD 206, in accordance with certain embodiments;

Control starts at block 402 in which an operating system 202 controls the access of a plurality of applications 204a . . . 204n to one or more solid state drives 206. The operating system priority and LBA range indication module 210 of the operating system 202 transmits (at block 404) an indication to the solid state drive 206 of the LBA range of each application and optionally the priority of each application.

Control proceeds to block 406 in which the operating system priority and range receipt module 212 of the solid state drive 206 receives the indication of the LBA range of each application and optionally the priority of each application, and determines (at block 408) whether the number of bands in the solid state drive 206 are sufficient to assign a different band to each application.

If the number of bands in the solid state drive 206 are sufficient to assign a different band to each application, then a separate band is assigned (at block 410) for writes of each application. If the number of bands in the solid state drive 206 are insufficient to assign a different band to each application, then separate bands are assigned for writes of higher priority applications and the writes of lower priority applications are intermingled in the same band (reference numeral 412).

Therefore, FIG. 4 illustrates certain embodiments in which an attempt is made to place the writes of different applications in different bands. If this is not possible, then writes of higher priority applications are placed in their own band, whereas writes of lower priority applications are intermingled within the same band.

Figure 5:
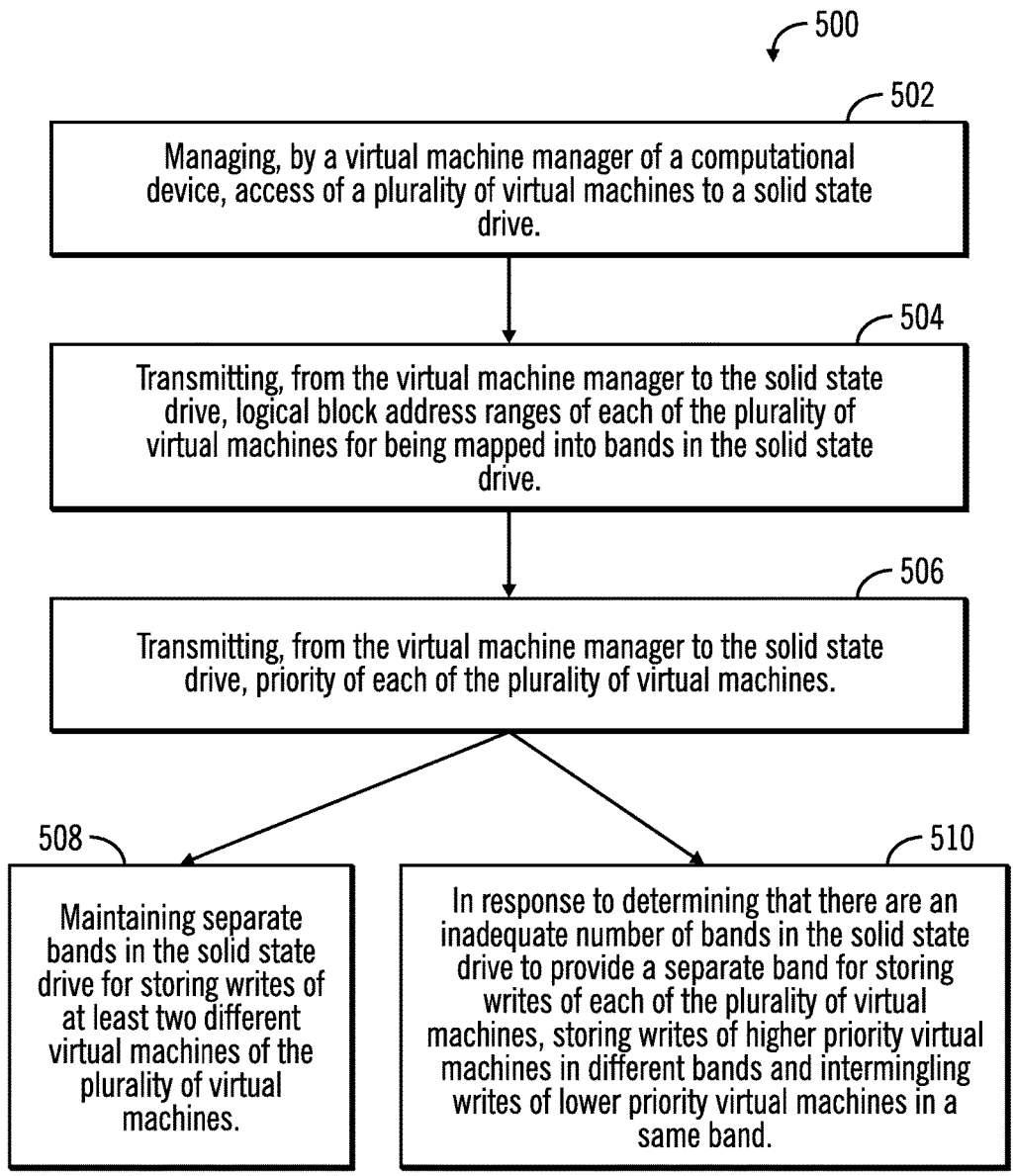
FIG. 5 illustrates a flowchart that shows further operations for writing data to a SSD in a computing environment in which a virtual machine manager controls the access of a plurality of virtual machines to write data to the SSD, in accordance with certain embodiments.

FIG. 5 illustrates a flowchart 600 that shows further operations for writing data to a SSD 106 in a computing environment 100 in which a virtual machine manager 102 controls the access of a plurality of virtual machines 104a . . . 104n to write data to the SSD 106, in accordance with certain embodiments.

Control starts at block 502 in which a virtual machine manager 102 of a computational device 108 manages access of a plurality of virtual machines 104a . . . 104n to a solid state drive 106.

The virtual machine manager 102 transmits (at block 504) to the solid state drive 106, logical block address ranges of each of the plurality of virtual machines 104a . . . 104n for being mapped into bands in the solid state drive 106. The virtual machine manager 102 then optionally transmits (at block 506) to the solid state drive 106, the priority of each of the plurality of virtual machines.

From block 506 control may proceed to block 508 or block 510. At block 508, separate bands are maintained in the solid state drive for storing writes of at least two different virtual machines of the plurality of virtual machines. At block 510, in response to determining that there are an inadequate number of bands in the solid state drive 106 to provide a separate band for storing writes of each of the plurality of virtual machines 104a . . . 104n, writes of higher priority virtual machines are stored in different bands and writes of lower priority virtual machines are intermingled in a same band.

Figure 6:
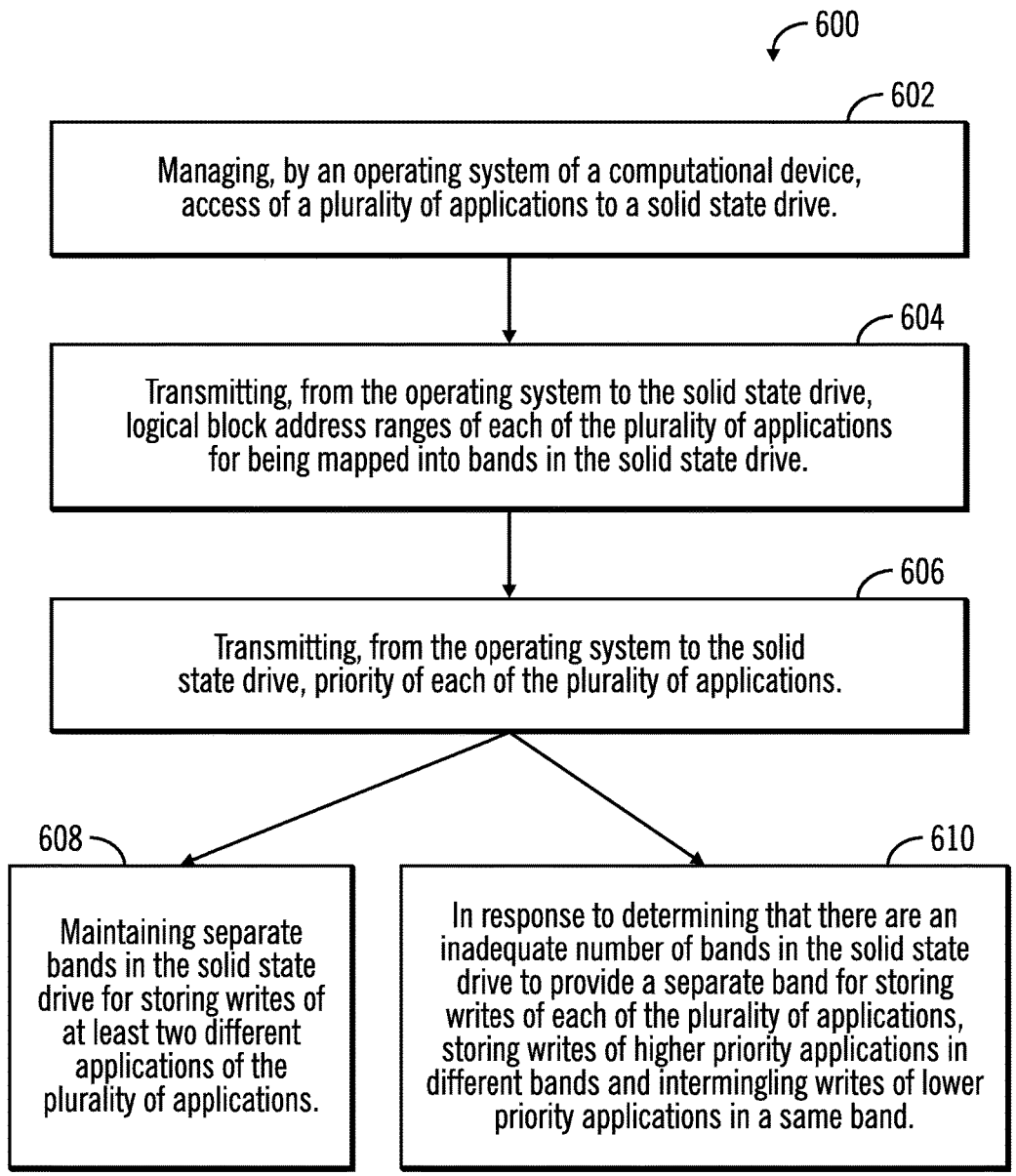
FIG. 6 illustrates a flowchart that shows further operations for writing data to a SSD in a computing environment in which an operating system controls the access of a plurality of applications to write data to the SSD, in accordance with certain embodiments.

FIG. 6 illustrates a flowchart 600 that shows further operations for writing data to a SSD 206 in a computing environment 200 in which an operating system 202 controls the access of a plurality of applications 204a . . . 204n to write data to the SSD 206, in accordance with certain embodiments.

Control starts at block 602 in which an operating system 202 of a computational device 208 manages access of a plurality of applications 204a . . . 104n to a solid state drive 206. The operating system 202 transmits (at block 604) to the solid state drive 206, logical block address ranges of each of the plurality of applications 204a . . . 204n for being mapped into bands in the solid state drive 206. The operating system 202 then optionally transmits (at block 606) to the solid state drive 206, the priority of each of the plurality of applications.

From block 606 control may proceed to block 608 or block 610. At block 608, separate bands are maintained in the solid state drive 206 for storing writes of at least two different applications of the plurality of applications 204a . . . 204n. At block 610, in response to determining that there are an inadequate number of bands in the solid state drive 206 to provide a separate band for storing writes of each of the plurality of applications 204a . . . 204n, writes of higher priority applications are stored in different bands and writes of lower priority applications are intermingled in a same band.

Figure 7:
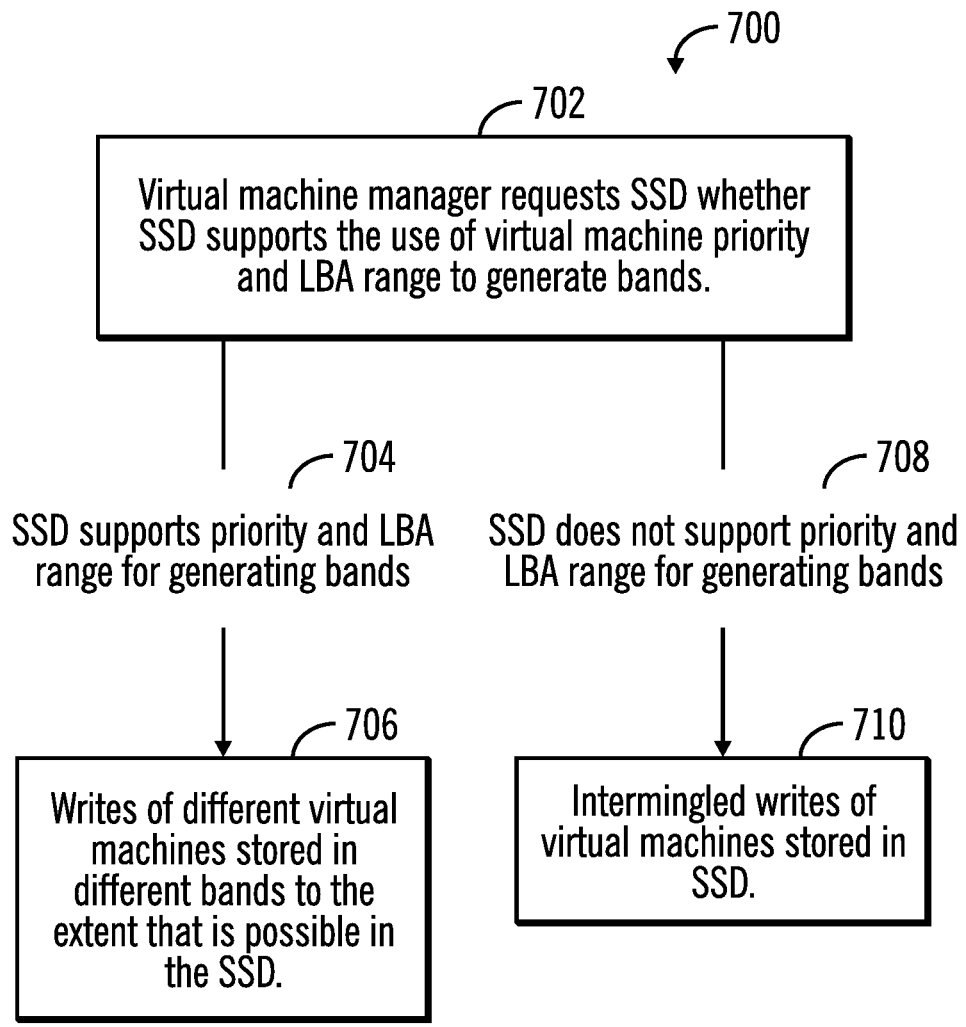
FIG. 7 illustrates a flowchart that shows further operations for writing data to a SSD in a computing environment in which a virtual machine manager controls the access of a plurality of virtual machines to write data to the SSD, where the SSD may or may not support priority and logical block address ranges for generating bands, in accordance with certain embodiments.

FIG. 7 illustrates a flowchart 700 that shows further operations for writing data to a SSD 106 in a computing environment 100 in which a virtual machine manager 102 controls the access of a plurality of virtual machines 104a . . . 104b to write data to the SSD 106, where the SSD 106 may or may not support priority and logical block address ranges for generating bands, in accordance with certain embodiments.

Control starts at block 702 in which the virtual machine manager 102 requests the SSD 106 as to whether the SSD 106 supports the use of virtual machine priority and LBA range to generate bands. If the SSD 106 supports (branch 704) priority and LBA range for generating bands, then writes of different virtual machines are stored in different bands to the extent that is possible on solid state disks. If the SSD 106 does not support (branch 708) priority and LBA range for generating bands, then intermingled writes of virtual machines are stored in the solid state drive 106. In alternative embodiments, instead of using a virtual machine manager and virtual machines as shown in FIG. 7, an operating system and applications may be used.

Therefore, FIGS. 1-7 illustrate certain embodiments in which by placing the writes of different virtual machines in different bands to the extent that is possible, the advantages of sequential I/O for performance are preserved even in a virtualized environment. Additionally, when an operating system controls a plurality of applications, by maintaining the writes of different applications in different bands to the extent that is possible, the advantages of sequential I/O for performance are preserved. The intermingling of data of different virtual machines or applications is minimized in the solid state drive for improving performance.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 8:
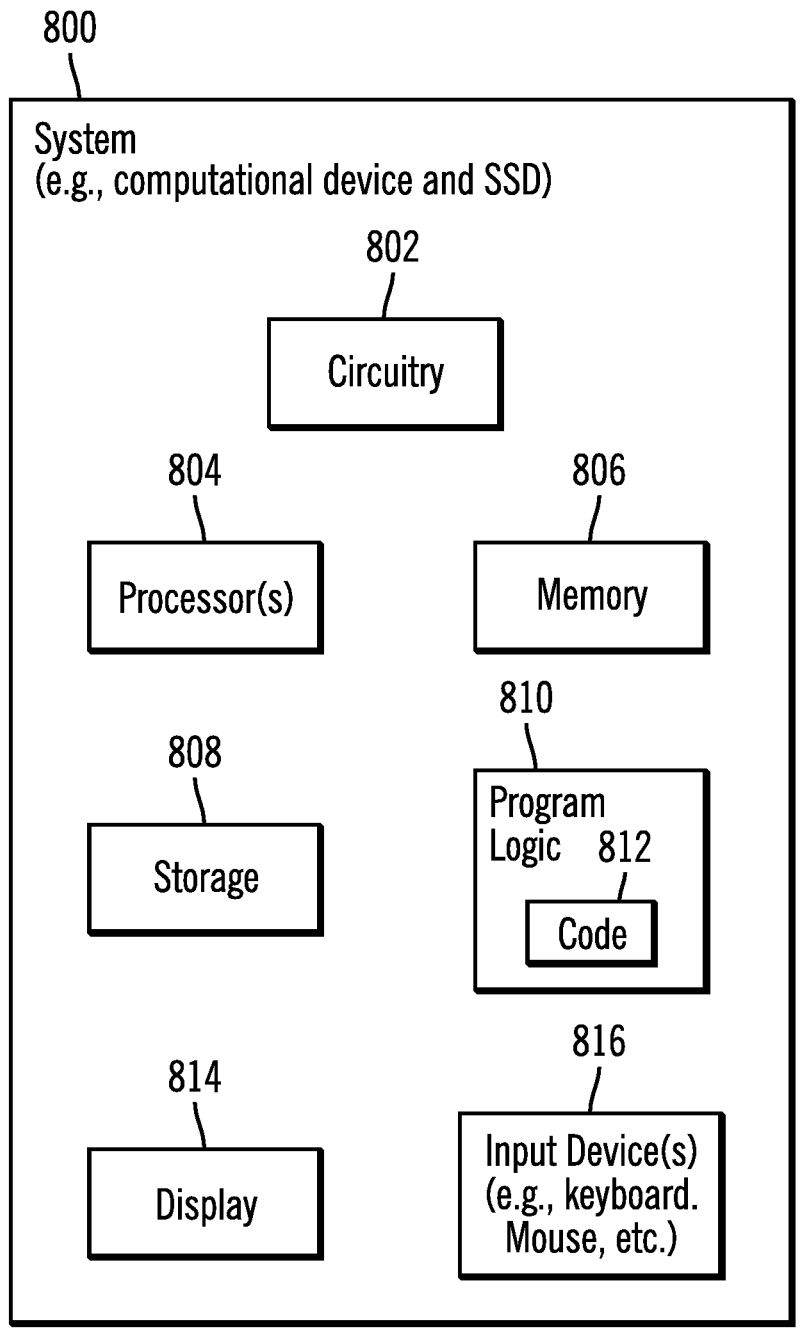
FIG. 8 illustrates a block diagram of a computational device that may include the SSD or may be coupled to the SSD, in accordance with certain embodiments.

FIG. 8 illustrates a block diagram of a system 800 that includes one or more of the computational devices 108, 208 (the computational devices 108, 208 comprise at least a processor) and one or more of the solid state drives 106, 206, in accordance with certain embodiments. For example, in certain embodiments the system 800 may have the computational device 108 and the solid state drive 106 included in the system 800, and in certain embodiments the system 800 may have the computational device 208 and the solid state drive 206 included in the system 800. In certain embodiments the system 800 may be a laptop computer that includes the solid state drive 106, 206.

The system 800 may include a circuitry 802 that may in certain embodiments include at least a processor 804. The system 800 may also include a memory 806 (e.g., a volatile memory device), and storage 808. The storage 808 may include the solid state drive 106, 206 or other drives or devices including a non-volatile memory device (e.g., EEPROM, ROM, PROM, flash, firmware, programmable logic, etc.). The storage 808 may also include a magnetic disk drive, an optical disk drive, a tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802. The system 800 may also include a display 814 (e.g., an liquid crystal display (LCD), a light emitting diode (LED) display, a cathode ray tube (CRT) display, a touchscreen display, or any other suitable display). The system 800 may also include one or more input devices 816, such as, a keyboard, a mouse, a joystick, a trackpad, or any other suitable input devices). Other components or devices beyond those shown in FIG. 8 may also be found in the system 800.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

Examples

The following examples pertain to further embodiments.

Example 1 is a method in which an operating system of a computational device, manages access of a plurality of applications to a solid state drive. Separate bands in the non-volatile memory of the solid state drive are maintained for storing data written to the solid state drive by at least two different applications of the plurality of applications.

In example 2, the subject matter of example 1 may include transmitting, from the operating system to the solid state drive, logical block address ranges of each of the plurality of applications for being mapped into bands in the solid state drive.

In example 3, the subject matter of example 2 may include transmitting, from the operating system to the solid state drive, priority of each of the plurality of applications.

In example 4, the subject matter of example 3 may include that in response to determining that there are an inadequate number of bands in the solid state drive to provide a separate band for storing writes of each of the plurality of applications, writes of higher priority applications are stored in different bands and writes of lower priority applications are intermingled in a same band, wherein a write comprises data to be written to the solid state drive.

In example 5, the subject matter of example 3 may include that the solid state drive stores in a non-volatile manner data related to the plurality of applications, the logical block address ranges, and the priority of each of the plurality of applications across a plurality of boots.

Example 6 is a method in which a virtual machine manager of a computational device maintains access of a plurality of virtual machines to a solid state drive. Separate bands in the non-volatile memory of the solid state drive are maintained for storing data written to the solid state drive by at least two different virtual machines of the plurality of virtual machines.

In example 7, the subject matter of example 6 may include transmitting, from the virtual machine manager to the solid state drive, logical block address ranges of each of the plurality of virtual machines for being mapped into bands in the solid state drive.

In example 8, the subject matter of example 7 may include transmitting, from the virtual machine manager to the solid state drive, priority of each of the plurality of virtual machines.

In example 9, the subject matter of example 8 may include that in response to determining that there are an inadequate number of bands in the solid state drive to provide a separate band for storing writes of each of the plurality of virtual machines, writes of higher priority virtual machines are stored in different bands and writes of lower priority virtual machines are intermingled in a same band, wherein a write comprises data to be written to the solid state drive.

In example 10, the subject matter of example 8 may include that the solid state drive stores in a non-volatile manner data related to the plurality of virtual machines, the logical block address ranges, and the priority of each of the plurality of virtual machines across a plurality of boots.

Example 11 is a system comprising a memory and a processor, wherein the processor is configurable to perform operations, the operations comprising: managing, by an operating system, access of a plurality of applications to a solid state drive; and maintaining separate bands in a non-volatile memory of the solid state drive for storing data written to the solid state drive by at least two different applications of the plurality of applications.

In example 12, the subject matter of example 11 may include transmitting, from the operating system to the solid state drive, logical block address ranges of each of the plurality of applications for being mapped into bands in the solid state drive.

In example 13, the subject matter of example 12 may include transmitting, from the operating system to the solid state drive, priority of each of the plurality of applications.

In example 14, the subject matter of example 13 may include that in response to determining that there are an inadequate number of bands in the solid state drive to provide a separate band for storing writes of each of the plurality of applications, writes of higher priority applications are stored in different bands and writes of lower priority applications are intermingled in a same band, wherein a write comprises data to be written to the solid state drive.

In example 15, the subject matter of example 13 may include that the solid state drive stores in a non-volatile manner data related to the plurality of applications, the logical block address ranges, and the priority of each of the plurality of applications across a plurality of boots.

Example 16 is a system comprising a memory and a processor, wherein the processor is configurable to perform operations in which a virtual machine manager of a computational device maintains access of a plurality of virtual machines to a solid state drive. Separate bands are maintained in a non-volatile memory of the solid state drive for storing data written to the solid state drive by at least two different virtual machines of the plurality of virtual machines.

In example 17, the subject matter of example 16 may include transmitting, from the virtual machine manager to the solid state drive, logical block address ranges of each of the plurality of virtual machines for being mapped into bands in the solid state drive.

In example 18, the subject matter of example 17 may include transmitting, from the virtual machine manager to the solid state drive, priority of each of the plurality of virtual machines.

In example 19, the subject matter of example 18 may include that in response to determining that there are an inadequate number of bands in the solid state drive to provide a separate band for storing writes of each of the plurality of virtual machines, writes of higher priority virtual machines are stored in different bands and writes of lower priority virtual machines are intermingled in a same band, wherein a write comprises data to be written to the solid state drive.

In example 20, the subject matter of example 18 may include that the solid state drive stores in a non-volatile manner data related to the plurality of virtual machines, the logical block address ranges, and the priority of each of the plurality of virtual machines across a plurality of boots.

Example 21 is a solid state drive, wherein the solid state drive is configurable to perform operations, the operations comprising: receiving, from a virtual machine manager of a computational device, input and output operations from a plurality of virtual machines; and maintaining separate bands in a non-volatile memory of the solid state drive for storing data written to the solid state drive by at least two different virtual machines of the plurality of virtual machines.

In example 22, the subject matter of example 21 further comprises receiving, from the virtual machine manager, logical block address ranges of each of the plurality of virtual machines for being mapped into bands in the solid state drive.

In example 23, the subject matter of example 22 further comprises receiving, from the virtual machine manager, priority of each of the plurality of virtual machines.

In example 24, the subject matter of example 23 further comprises that in response to determining that there are an inadequate number of bands to provide a separate band for storing writes of each of the plurality of virtual machines, writes of higher priority virtual machines are stored in different bands and writes of lower priority virtual machines are intermingled in a same band, wherein a write comprises data to be written to the solid state drive.

In example 25, the subject matter of example 23 further comprises that the solid state drive stores in a non-volatile manner data related to the plurality of virtual machines, the logical block address ranges, and the priority of each of the plurality of virtual machines across a plurality of boots.

Example 26 is a system comprising a memory and a processor, wherein the processor is configurable to perform operations in which a virtual machine manager of a computational device maintains access of a plurality of virtual machines to a solid state drive. Separate bands are maintained in a non-volatile memory of the solid state drive for storing data written to the solid state drive by at least two different virtual machines of the plurality of virtual machines.

In example 27, the subject matter of example 26 may include transmitting, from the virtual machine manager to the solid state drive, logical block address ranges of each of the plurality of virtual machines for being mapped into bands in the solid state drive.

In example 28, the subject matter of example 27 may include transmitting, from the virtual machine manager to the solid state drive, priority of each of the plurality of virtual machines.

In example 29, the subject matter of example 28 may include that in response to determining that there are an inadequate number of bands in the solid state drive to provide a separate band for storing writes of each of the plurality of virtual machines, writes of higher priority virtual machines are stored in different bands and writes of lower priority virtual machines are intermingled in a same band, wherein a write comprises data to be written to the solid state drive.

In example 30, the subject matter of example 28 may include that the solid state drive stores in a non-volatile manner data related to the plurality of virtual machines, the logical block address ranges, and the priority of each of the plurality of virtual machines across a plurality of boots.

In example 31, the subject matter of example 26 may include that the solid state drive is configurable to perform operations, the operations performed by the solid state drive comprising: receiving, from a virtual machine manager of a computational device, input and output operations from a plurality of virtual machines; and maintaining separate bands in a non-volatile memory of the solid state drive for storing data written to the solid state drive by at least two different virtual machines of the plurality of virtual machines.

In example 32, the subject matter of example 31 further comprises receiving, from the virtual machine manager, logical block address ranges of each of the plurality of virtual machines for being mapped into bands in the solid state drive.

In example 33, the subject matter of example 32 further comprises receiving, from the virtual machine manager, priority of each of the plurality of virtual machines.

In example 34, the subject matter of example 33 further comprises that in response to determining that there are an inadequate number of bands to provide a separate band for storing writes of each of the plurality of virtual machines, writes of higher priority virtual machines are stored in different bands and writes of lower priority virtual machines are intermingled in a same band, wherein a write comprises data to be written to the solid state drive.

In example 35, the subject matter of example 33 further comprises that the solid state drive stores in a non-volatile manner data related to the plurality of virtual machines, the logical block address ranges, and the priority of each of the plurality of virtual machines across a plurality of boots.

What is claimed is:

1. A method, comprising:
   in response to creation of each application of a plurality of applications, transmitting, from an operating system to a solid state drive, a logical block address range and a priority of the application, wherein sequential input/output (I/O) from the plurality of applications are intermingled prior to being issued to the solid state drive; and
   in response to determining that there are an inadequate number of bands in the solid state drive to provide a separate band for storing writes of each of the plurality of applications, storing writes of higher priority applications in different bands and intermingling writes of lower priority applications in a same band, wherein each band is a collection of contiguous pre-erased erase blocks.

2. The method of claim 1, wherein a write comprises data to be written to the solid state drive, wherein the solid state drive stores in a non-volatile manner data related to the plurality of applications, logical block address ranges, and the priority of each of the plurality of applications across a plurality of boots.

3. The method of claim 1, the method further comprising:
   requesting, by the operating system, from the solid state drive whether the solid state drive supports priority and logical block address range for generating bands;
   in response to the solid state drive supporting priority and logical block address range, writes of different applications are stored in different bands to an extent that is possible in the solid state drive; and
   in response to the solid state drive not supporting priority and logical block address range, intermingled writes are stored in the solid state drive.

4. The method of claim 1, wherein the solid state drive stores the writes of higher priority applications in different bands by using logical block address ranges of the higher priority applications.

5. The method of claim 1, wherein the transmitting is also performed in response to any of the plurality of applications being modified.

6. A method, comprising:
   in response to creation of each virtual machine of a plurality of virtual machines, transmitting, from a virtual machine manager to a solid state drive, a logical block address range and a priority of the virtual machine, wherein sequential input/output (I/O) from the plurality of virtual machines are intermingled prior to being issued to the solid state drive; and
   in response to determining that there are an inadequate number of bands in the solid state drive to provide a separate band for storing writes of each of the plurality of virtual machines, storing writes of higher priority virtual machines in different bands and intermingling writes of lower priority virtual machines in a same band, wherein each band is a collection of contiguous pre-erased erase blocks.

7. The method of claim 6, wherein a write comprises data to be written to the solid state drive, wherein the solid state drive stores in a non-volatile manner data related to the plurality of virtual machines, logical block address ranges, and the priority of each of the plurality of virtual machines across a plurality of boots.

8. The method of claim 6, the method further comprising:
   requesting, by the virtual machine manager, from the solid state drive whether the solid state drive supports priority and logical block address range for generating bands;
   in response to the solid state drive supporting priority and logical block address range, writes of different virtual machines are stored in different bands to an extent that is possible in the solid state drive; and
   in response to the solid state drive not supporting priority and logical block address range, intermingled writes are stored in the solid state drive.

9. The method of claim 6, wherein the solid state drive stores writes of the higher priority virtual machines in different bands by using logical block address ranges of the higher priority virtual machines.

10. The method of claim 6, wherein the transmitting is also performed in response to any of the plurality of virtual machines being modified.

11. A system, comprising:
    a memory; and
    a processor, wherein the processor is operable to:
        in response to creation of each application of a plurality of applications, transmit from an operating system to a solid state drive, a logical block address range and a priority of the application, wherein sequential input/output (I/O) from the plurality of applications are intermingled prior to being issued to the solid state drive; and
        in response to a determination that there are an inadequate number of bands in the solid state drive to provide a separate band for storing writes of each of the plurality of applications, store writes of higher priority applications in different bands and intermingle writes of lower priority applications in a same band, wherein each band is a collection of contiguous pre-erased erase blocks.

12. The system of claim 11, wherein a write comprises data to be written to the solid state drive, wherein the solid state drive is operable to store in a non-volatile manner data related to the plurality of applications, logical block address ranges, and the priority of each of the plurality of applications across a plurality of boots.

13. The system of claim 11, wherein the processor is further operable to:
    request, by the operating system, from the solid state drive whether the solid state drive supports priority and logical block address range for generating bands wherein:
    in response to the solid state drive supporting priority and logical block address range, writes of different applications are stored in different bands to an extent that is possible in the solid state drive; and
    in response to the solid state drive not supporting priority and logical block address range, intermingled writes are stored in the solid state drive.

14. The system of claim 11, wherein the solid state drive is operable to store the writes of the higher priority applications in different bands by use of logical block address ranges of the higher priority applications.

15. The system of claim 11, wherein the transmit is also performed in response to any of the plurality of applications being modified.

16. A system, comprising:
    a memory; and
    a processor, wherein the processor is operable to:
        in response to creation of each virtual machine of a plurality of virtual machines, transmit, from a virtual machine manager to a solid state drive, a logical block address range and a priority of the virtual machine, wherein sequential input/output (I/O) from the plurality of virtual machines are intermingled prior to being issued to the solid state drive; and
        in response to a determination that there are an inadequate number of bands in the solid state drive to provide a separate band for storing writes of each of the plurality of virtual machines, store writes of higher priority virtual machines in different bands and intermingle writes of lower priority virtual machines in a same band, wherein each band is a collection of contiguous pre-erased erase blocks.

17. The system of claim 16, wherein a write comprises data to be written to the solid state drive, wherein the solid state drive is operable to store in a non-volatile manner data related to the plurality of virtual machines, logical block address ranges, and the priority of each of the plurality of virtual machines across a plurality of boots.

18. The system of claim 16, wherein the processor is further operable to:

request, by the virtual machine manager, from the solid state drive whether the solid state drive supports priority and logical block address range for generating bands wherein:
  in response to the solid state drive supporting priority and logical block address range, writes of different virtual machines are stored in different bands to an extent that is possible in the solid state drive; and
  in response to the solid state drive not supporting priority and logical block address range, intermingled writes are stored in the solid state drive.

19. The system of claim 16, wherein the solid state drive is operable to store the writes of the higher priority virtual machines in different bands by use of logical block address ranges of the higher priority virtual machines.

20. The system of claim 16, wherein the transmit is also performed in response to any of the plurality of virtual machines being modified.

21. A solid state drive, wherein the solid state drive is operable to:
  in response to creation of each virtual machine of a plurality of virtual machines, receive from a virtual machine manager a logical block address range and a priority of the virtual machine, wherein sequential input/output (I/O) from the plurality of virtual machines are intermingled prior to being issued to the solid state drive; and
  in response to a determination that there are an inadequate number of bands in the solid state drive to provide a separate band for storing writes of each of the plurality of virtual machines, store writes of higher priority virtual machines in different bands and intermingle writes of lower priority virtual machines in a same band, wherein each band is a collection of contiguous pre-erased erase blocks.

22. The solid state drive of claim 21, wherein a write comprises data to be written to the solid state drive, wherein the solid state drive is operable to store in a non-volatile manner data related to the plurality of virtual machines, logical block address ranges, and the priority of each of the plurality of virtual machines across a plurality of boots.

23. The solid state drive of claim 21, wherein: the solid state drive is requested by the virtual machine manager whether the solid state drive supports priority and logical block address range for generating bands;
  in response to the solid state drive supporting priority and logical block address range, writes of different virtual machines are stored in different bands to an extent that is possible in the solid state drive; and
  in response to the solid state drive not supporting priority and logical block address range, intermingled writes are stored in the solid state drive.

24. The solid state drive of claim 21, wherein the solid state drive is further operable to store the writes of the higher priority virtual machines in different bands by use of logical block address ranges of the higher priority virtual machines.

25. The solid state drive of claim 21, wherein the receive is also performed in response to any of the plurality of virtual machines being modified.

* * * * *